April 10, 1945.  R. C. TOLLEFSON  2,373,153
PRODUCTION OF BUTADIENE
Filed April 22, 1943
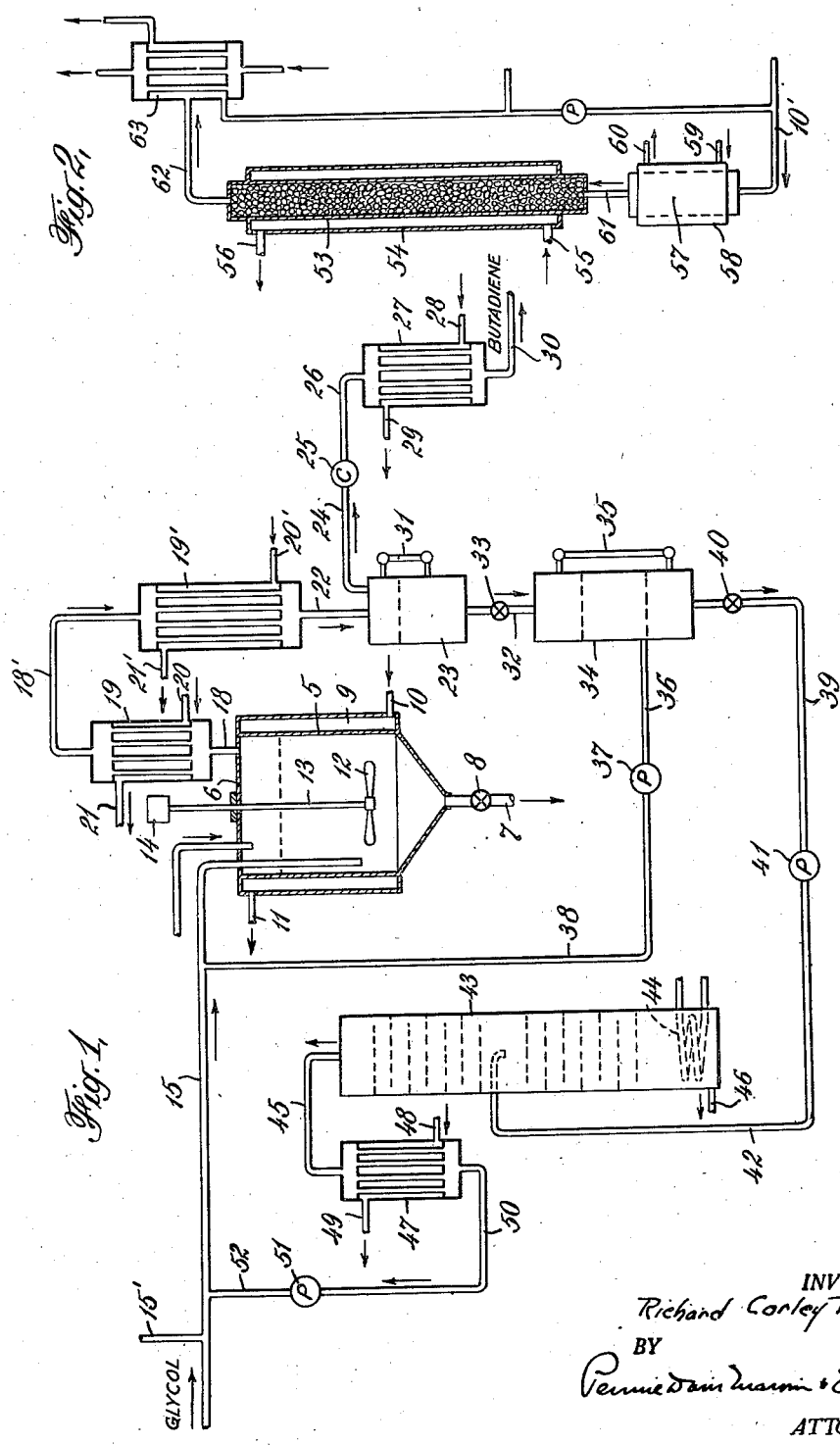
INVENTOR.
Richard Carley Tollefson
BY
Pennie Davis Marvin & Edmonds
ATTORNEYS Patented Apr. 10, 1945

2,373,153

UNITED STATES PATENT OFFICE 2,373,153

PRODUCTION OF BUTADIENE

Richard Corley Tollefson, Stamford, Conn., assignor to Air Reduction Company, Incorporated, New York, N. Y., a corporation of New York Application April 22, 1943, Serial No. 484,021

8 Claims. (Cl. 260—681)

This invention relates to the production of 1,3-butadiene from 1,3-butylene glycol and particularly to an improved method affording a commercially practicable procedure for the economical recovery of the desired product.

1,3-butadiene is derived from 1,3-butylene glycol by splitting off water in accordance with the following reaction:

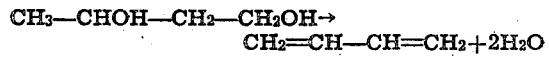

$$CH_3-CHOH-CH_2-CH_2OH \rightarrow CH_2=CH-CH=CH_2 + 2H_2O$$

Procedures involving dehydration of 1,3-butylene glycol in the presence of various catalysts have been suggested heretofore. Catalysts consisting of phosphates of calcium or sodium may be utilized. Improved methods for accomplishing the desired result are described in the applications of Arthur E. Lorch, Serial No. 477,939 filed March 4, 1943, and Serial No. 483,343 filed April 16, 1943, in which the preferred catalyst is "ammonium phosphate."

It is the object of the present invention to effect further improvements in the dehydration of 1,3-butylene glycol and particularly to ensure more efficient operation and better recovery of 1,3-butadiene therefrom.

Another object of the invention is the provision of a method which ensures prolonged activity of the catalyst mass and avoidance of disintegration thereof, thus increasing the overall efficiency of the operation.

Other objects and advantages of the invention will be apparent as it is better understood by reference to the following specification and the accompanying drawing, in which Fig. 1 illustrates diagrammatically an apparatus suitable for the practice of the invention; and Fig. 2 represents diagrammatically a modified form thereof.

While the invention is not limited to the precise procedure and to the catalysts described in the applications of Arthur E. Lorch above identified, its advantages may be well illustrated by reference to these procedures.

In application Serial No. 477,939, a method is described involving the heating of 1,3-butylene glycol in relatively low concentrations in an inert liquid including a dehydration catalyst and in the absence of substantial amounts of water in the liquid phase. The procedure requires the maintenance of a body of a suitable liquid at a temperature favorable to the reaction, that is, within the range of 220° to 350° C., the preferred range being from 260° to 285° C. The catalyst may be dissolved or suspended in the liquid. The glycol is introduced at substantially the rate at which conversion to butadiene occurs, so that no substantial amount of glycol remains at any time in the liquid. Suitable liquids for use in the method include diphenyl ethane, hexaethyl benzene, benzyl ether, a mixture of diphenyl and diphenyl oxide known as "Dowtherm," a refined petroleum product known as "Nujol," Texas Co. #531 wash oil, a topped fuel oil having a boiling point of 260-270° C., Bunker C oil and a higher alcohol known to the trade as "cyclic $C_{18}$ alcohol." The liquid selected with the dissolved or suspended catalyst may be heated to the desired temperature by means of a jacket through which a heating liquid such as "Dowtherm" is circulated. It is agitated preferably to ensure adequate contact between the glycol and the catalyst.

In the method as described in application Serial No. 483,343, dehydration is carried out in the vapor phase. To permit such operation, the catalyst, mounted on a suitable carrier, preferably one composed essentially of silica such as a calcined diatomaceous earth known as "Celite V" or silica bonded with feldspar is disposed in a suitable chamber and maintained at a temperature ranging from 220° to 400° C., and preferably within the range of approximately 280° to 320° C. The temperature may be maintained by employing a suitable jacket about the chamber and circulating a heating liquid such for example as "Dowtherm" therethrough. The glycol is introduced to the chamber and passed over the catalyst body, which effects the desired dehydration.

As the catalyst, I prefer to employ "ammonium phosphate." The term "ammonium phosphate" is employed as a general designation of the tri, di and mono ammonium phosphates or mixtures of these salts. It is employed also to include decomposition products of these phosphates which are subject to modification when subjected to temperatures such as those employed in the method. The precise composition of the resultant salt or salts in the catalyst mass at the temperature maintained cannot be determined accurately. Any of the phosphates mentioned or the resulting products are active catalysts for the reaction. "Ammonium phosphate" is markedly superior to the phosphate catalysts which have been mentioned heretofore in the literature concerning dehydration of 1,3-butylene glycol. However, other catalysts may be employed, the present invention being directed to an improvement in the effective operation of active catalysts for the dehydration of 1,3-butylene glycol.

I have discovered that various catalysts, and particularly "ammonium phosphate" become more effective for the purpose of the invention if the reaction is conducted in the presence of volatile basic materials. The term "volatile basic materials" includes such compounds as ammonia, volatile substituted amines such as for example the primary, secondary or tertiary ethyl, propyl or butyl amines, aniline, pyridine, or materials which will decompose under the conditions of reaction to give volatile bases such, for example, as urea. The introduction of volatile basic materials to the reaction results in an increased and/or extended life of the catalyst, an increased specificity of the reaction resulting in an increased yield of 1,3-butadiene and as a result thereof increased purity of the butadiene produced.

The desired improvement can be effected by introducing the volatile basic material into the 1,3-butylene glycol before it is fed to the reaction zone. Alternatively, the volatile basic material can be introduced separately into the catalytic zone and allowed to mix therein with the vapors of 1,3-butylene glycol before or during contact of the latter with the catalyst.

The ratio of the volatile basic material to the 1,3-butylene glycol may be varied over a considerable range and will be adjusted to fit the individual case, since the amount required to give optimum results will depend in part upon the particular catalyst in use, the degree of activity of the catalyst, and the temperature of operation. As an example, I find that when commercial concentrated ammonia solution is used (approximately 28% NH3 by weight) good results have been obtained with ratios of parts by weight of NH3 to 1,3 butylene glycol ranging from 1:43 down to 1:3000. In most cases a range of from 1:50 to 1:100 parts by weight will be found to give the results desired. These ratios are based upon anhydrous 1,3-butylene glycol, though in many cases the glycol fed to the reaction may be diluted with water.

The procedure will be readily understood by reference to the drawing, it being understood that the apparatus described is merely illustrative of suitable equipment for the purpose. The reactor 5 is a receptacle having a closure 6 and and outlet 7 controlled by a valve 8. A heating jacket 9 is adapted to be supplied through a pipe 10 with a suitable heating liquid which escapes through the pipe 11 and is reheated for circulation through the jacket. Any suitable heating liquid adapted to be maintained at the desired temperature may be employed. "Dowtherm" is well adapted for the purpose, since it may be maintained readily at the desired temperature to heat the body of liquid within the reactor 5. An agitator 12 is supported on a shaft 13 and is adapted to be driven from any suitable source such as a motor 14 to maintain the desired agitation during the reaction.

The reactor 5 is partially filled with the selected heating liquid in which the catalyst is suspended or dissolved. Glycol is introduced through the pipe 15 from any suitable source of supply at substantially the rate of reaction. The selected volatile base material, such as commercially concentrated ammonia solution, is introduced to the pipe 15 through a pipe 15' from a source of supply. The glycol, carrying the volatile basic material, enters beneath the surface of the liquid in the reactor and immediately is raised to the temperature of the heating liquid, while it is brought into contact with the catalyst. As the result, butadiene is produced and escapes together with water vapor formed as a result of the reaction, some unreacted or partially reacted glycol, and possibly some entrained heating liquid, through a pipe 18. The vapors pass to a reflux condenser 19. Cooling water is supplied through a pipe 20 and escapes through a pipe 21. The unreacted glycol and any of the bath liquid return through the pipe 18 to the reactor.

The remaining vapors are delivered by a pipe 18' to a condenser 19' supplied with cooling water which circulates through the pipes 20' and 21'. The condensate, consisting of water and partially reacted glycol or butenol, is delivered by a pipe 22 to a collector 23. The butadiene escapes through a pipe 24 and may be delivered to a gasometer (not shown).

Preferably it is compressed in a compressor 25 to a pressure at which it will liquefy at atmospheric temperature. It is delivered then through a pipe 26 to a condenser 27. Cooling water is supplied through a pipe 28 and escapes through a pipe 29. The condensed butadiene is withdrawn through a pipe 30.

The level of the condensed liquid in the collector 23 may be observed through a sight glass 31, and as desired it may be delivered through a pipe 32 controlled by a valve 33 to a separator 34. Usually the liquid separates in two levels, the upper level consisting principally of partially reacted glycol. A sight glass 35 permits observation of the liquid levels. The upper layer may be withdrawn through a pipe 36 and delivered by a pump 37 and pipe 38 to a pipe 15 through which it is returned to the reactor 5.

The liquid in the bottom of the separator 34 is water with some partially reacted glycol or butenol. This liquid may be withdrawn through the pipe 39 controlled by a valve 40, and delivered by a pump 41 through a pipe 42 to a column 43. Heat is supplied at the bottom of the column by a steam coil 44. Rectification in the column results in an effluent consisting of partially reacted glycol and water which escapes through a pipe 45. The bulk of the water is withdrawn at the bottom of the column through a pipe 46. The effluent is delivered to a condenser 47 cooled by water supplied by a pipe 48 and escaping through a pipe 49. The condensate is withdrawn through a pipe 50 and delivered by a pump 51 and pipe 52 to the pipe 15 and is thus returned to the reactor 5.

If the reaction is to be conducted in the vapor phase, it is necessary merely to substitute for the reactor 5 a chamber for the catalyst body and a vaporizer as shown in Fig. 2, in which 53 indicates an elongated chamber of any suitable material surrounded by a jacket 54 through which a heating liquid is circulated by means of pipes 55 and 56. The glycol with the volatile basic material added thereto is introduced through the pipe 10' to a vaporizer 57, surrounded by a jacket 58 through which a suitable heating liquid is circulated by means of pipes 59 and 60. The vaporized material is delivered through the pipe 61 to the catalyst chamber, and the vapors are withdrawn therefrom through a pipe 62 and delivered thereby to the condenser 63 and other equipment described in connection with Fig. 1.

As in the preceding modification, butadiene is separated from the vapors and may be condensed and withdrawn. The unreacted and partially reacted glycol are returned for further treatment.

The following examples illustrate the application of the invention in practical operation:

Example I

A catalyst was prepared by soaking 4-8 mesh "Celite V" in a saturated aqueous solution of di-ammonium phosphate. After draining, the catalyst was dried at 100° C. A reaction chamber one inch in diameter and four feet in length, heated by means of a jacket, was provided with a body of catalyst approximately two feet in depth. The temperature was maintained at 300–320° C. A mixture of 50 parts by weight of 1,3-butylene glycol and 1 part of $NH_3$ diluted with an equal volume of water, was fed at the rate of 25–35 grams of glycol per hour. The conversion to 1,3-butadiene remained above 60% for nine days, dropping after ten days to 44%. The purity of the butadiene produced remained at 96% over the entire run.

In contrast, a similar operation in which no ammonia was used resulted in 60% conversion for only four and a half days, dropping at the end of the sixth day to 24%. The purity of the butadiene formed dropped from an initial 92% to 82% at the end of the run.

Example II

A pelleted catalyst composed of 30% ammonium phosphate and 70% Filtercel (a diatomaceous earth) was placed in the catalyst chamber as described in the preceding example. Butylene glycol was fed to the catalyst without ammonia. After operation for thirteen days the butadiene purity had dropped to 80%. Ammonia was then added to the butylene glycol as in Example I. After five and a half hours' operation, the purity of the 1,3-butadiene produced had risen to 93%.

Example III

In an apparatus similar to that described in Example I, a pelleted catalyst composed of 10 parts of $CaHPO_4$ and 1 part $(NH_4)_2HPO_4$ was used. Butylene glycol without ammonia was fed to the catalyst for six days. The butadiene purity dropped to 85%. 1 part of $NH_3$ for each 475 parts of butylene glycol was then introduced to the catalyst. After seventeen hours of operation, the butadiene purity had increased to 92%.

Example IV

In an apparatus similar to that described in connection with Example I, a catalyst composed of 15% di-ammonium phosphate mounted on feldspar-bonded silica of 4-8 mesh size was used. A feed of 75% aqueous solution of 1,3-butylene glycol at the rate of 25–35 grams of butylene glycol per hour was introduced to the catalyst, which was maintained at a temperature of approximately 300° C. .2% ammonia was added to the glycol feed. After operating for fifty-six days, the catalyst was removed and was found to have disintegrated only to the extent of about 50%.

The same operation conducted in the absence of ammonia resulted in complete disintegration of the catalyst within the same period.

Example V

In a reactor as described in connection with Fig. 1 of the drawing, 250 parts of Texas Co. #531 wash oil and a finely divided mixture of 6 parts of di-ammonium phosphate and 12 parts of coke were used. The temperature of the liquid was maintained at 240–280° C., and a mixture of approximately 750 parts of 1,3-butylene glycol, 250 parts of water and 5 parts of urea all by weight was introduced below the liquid level in the reactor at the rate of approximately 12 parts per hour. The yield of 1,3-butadiene ranged from 79% to 89% and its purity varied over a range of 91.3% to 95.0%.

Example VI

In a reactor similar to that described in Fig. 1 of the drawing, there were placed 250 parts of a higher alcohol known to the trade as "cyclic $C_{18}$ alcohol" and 3 parts of 85% orthophosphoric acid. The bath was heated to 250°–260° C., and about 16 parts per hour of 1,3-butylene glycol were introduced into the liquid bath. Twenty-five per cent of the glycol so fed was converted to butadiene, the gas collected having a butadiene content of 66%.

2½ parts of $NH_3$ per 1000 parts of glycol were then fed to the reactor. Within one hour the conversion had increased to 38%, the gas collected having a butadiene content of 73%. At the end of the second hour of operation the conversion had risen to 43%.

I do not wish to be limited to any theory concerning the effectiveness of volatile basic materials in the catalytic dehydration of 1,3-butylene glycol. It is possible that the basic materials combine with free phosphoric acid present in the catalyst and thereby alter its properties sufficiently to permit a more clean-cut reaction and the production of higher yields. In any event, as is evident from the foregoing examples, the inclusion of volatile basic materials as described herein in the reaction facilitates and improves the separation of water from 1,3-butylene glycol and effects marked improvement both in the yield and in the purity of the product. The addition of the volatile basic material is desirable when the operation involves a fresh catalyst. As shown by the examples, it also effects a marked improvement when the catalyst has been partially depleted.

While the invention is described more particularly with respect to the dehydration of 1,3 butylene glycol, it may be used effectively in the treatment of partially reacted glycol or butenol.

Various changes may be made in the procedure and in the apparatus employed without departing from the invention or sacrificing the advantages thereof.

I claim:

1. The method of improving the dehydration of 1,3-butylene glycol to produce 1,3-butadiene which comprises feeding the glycol to a chamber containing an acid reacting dehydration catalyst and continuously introducing a proportion of volatile basic material for contact with the catalyst during the reaction.

2. The method of improving the dehydration of 1,3-butylene glycol to produce 1,3-butadiene which comprises feeding the glycol to a chamber containing an acid reacting dehydration catalyst and continuously introducing a proportion of ammonia for contact with the catalyst during the reaction.

3. The method of improving the dehydration of 1,3-butylene glycol to produce 1,3-butadiene which comprises adding to the glycol a proportion of volatile basic material and continuously introducing the mixture to a chamber containing an acid reacting dehydration catalyst.

4. The method of improving the dehydration of 1,3-butylene glycol to produce 1,3-butadiene which comprises adding to the glycol a proportion of ammonia and continuously introducing the mixture to a chamber containing an acid reacting dehydration catalyst.

5. The method of improving the dehydration of 1,3-butylene glycol to produce 1,3-butadiene which comprises feeding the glycol to a chamber containing ammonium phosphate and continuously introducing a proportion of volatile basic material for contact with the ammonium phosphate during the reaction.

6. The method of improving the dehydration of 1,3-butylene glycol to produce 1,3-butadiene which comprises feeding the glycol to a chamber containing ammonium phosphate and continuously introducing a proportion of ammonia for contact with the ammonium phosphate during the reaction.

7. The method of improving the dehydration of 1,3-butylene glycol to produce 1,3-butadiene which comprises adding to the glycol a proportion of volatile basic material and continuously introducing the mixture to a chamber containing ammonium phosphate.

8. The method of improving the dehydration of 1,3-butylene glycol to produce 1,3-butadiene which comprises adding to the glycol a proportion of ammonia and continuously introducing the mixture to a chamber containing ammonium phosphate.

RICHARD CORLEY TOLLEFSON.